INVENTOR.
RAYMOND B. PETTIBONE
BY Van Meter and George
ATTORNEYS

INVENTOR.
RAYMOND B. PETTIBONE
BY Van Meter and George
ATTORNEYS

United States Patent Office 3,187,678
Patented June 8, 1965

3,187,678
POWER TRANSMISSION
Raymond B. Pettibone, Detroit, Mich., assignor to Sperry Rand Corporation, a corporation of Delaware
Filed May 19, 1959, Ser. No. 814,293
9 Claims. (Cl. 103—136)

This invention relates to power transmissions and is particularly applicable to those of the type comprising two or more fluid pressure energy translating devices, one of which may function as a pump and another as a fluid motor.

This invention relates generally to rotary fluid energy translating devices. More particularly, this invention relates to a high pressure, vane type pump having a symmetrical dual floating pressure plate system. Such a system incorporates an unbalance pressure relationship between the parts forming a unique removable cartridge which comprises the rotating group and floating cheek plates. This improved arrangement permits complete removal of the cartridge from the pump as well as ease of assembly and disassembly in replacing one or more parts of the cartridge.

The hydraulic devices of the present day have been adapted to heavy earthmoving equipment and the like where higher and higher pressures are being demanded. It is therefore necessary to meet the present and immediate future requirements of industry for increased horsepower capabilities along with an extensive pressure range. These objectives must be achieved without sacrificing the volumetric efficiency of the pump.

It is well known in the design of a vane pump of the cartridge or noncartridge type that proper clearance must be allowed between the rotor faces and the adjacent pressure plate surfaces against which the faces rotate. It is advisable to have a slight clearance in order to have the rotor run freely but of such a size so as not to decrease the volumetric efficiency of the pump.

It has been previously proposed to control the leakage paths and clearances on one side of the rotor of a noncartridge type of vane pump by applying the output fluid pressure or a part thereof to the outer face of an axially adjustable pressure responsive plate for adjusting the clearances and for maintaining a sealed relation with the associated ring and rotor. Although such floating pressure plate type of pump is a great improvement over the fixed type, the single plate type is not completely satisfactory for operations in the range of 2500 to 5000 p.s.i. When utilizing the single plate type of pump at high pressures in the range of 2500 to 5000 p.s.i., the leakage problem is multiplied with the result that the volumetric efficiency is materially reduced.

It is therefore necessary at high pressures to adequately control the leakage paths on both sides of the rotor as well as to provide proper clearance between the rotor faces and the surfaces against which they rotate.

The introduction of the stepped vane and intravane types of pumps permit operation in the very high pressure ranges. However, a problem still exists of controlling leakage paths on both sides of the rotor due to higher pressures. The solution of this problem meant a departure from the conventional designs. Not only did the new design have to meet the increased horsepower requirements but also the extensive pressure requirements while improving the volumetric efficiency of the pump.

One method for minimizing or controlling the leakage paths on each side of the rotor while improving the volumetric efficiency of the pump is to provide a unique balanced removable cartridge unit which incorporates a symmetrical dual floating pressure plate system designed to maintain a given ring rotor clearance space independent of load pressures.

It was found that the volumetric efficiency may be improved by utilizing a precise unbalance relationship between the effective pressure areas which act to maintain the pressure plates in fluid sealing engagement with the ring and rotor. This precise unbalance relationship is accomplished by carefully proportioning the relative areas of the inner surfaces and the outer surfaces of the plates. It is possible with this arrangement to control within very close limits the actual sealing pressure required during operation of the pump. It requires a somewhat higher effective pressure in the direction of seal than in the direction tending to open the seal.

The hydraulic pump may be made from various types of lightweight material so as to meet the temperatures encountered at high speeds and pressures, particularly when applied to applications requiring pumps in an extremely high pressure range. The size of the fluid device may be from a relatively small displacement to a relatively large displacement per revolution. The unbalance design will reduce the wear rate between the floating pressure plates and the ring and rotor while maintaining a proper fluid seal arrangement on each side of the rotor. It has been found by using the dual floating pressure plate system that high pressures in the range of 2500 to 5000 p.s.i. may be obtained which will operate continuously or intermittently with a reasonably satisfactory life.

It should be noted, however, that for applications within a pressure range wherein a single pressure loaded cheek plate type of pump has been proven to be satisfactory, the cartridge may be modified by fixing one cheek plate to the ring on one side of the rotor and vanes and providing a pressure loaded cheek plate on the opposite side of the ring and vane carrying rotor. The pressure loaded plate, for example, could be free to float slightly on the ends of bolts extending through the ring while the cheek plate on the opposite side would be fixed to the ring by means of a threaded engagement of the bolts at their opposite ends to the ring. All of the advantages of a single, floating cheek plate type of construction as disclosed in the patent to Gardiner et al., No. 2,544,988, are thus retained, but the important additional advantage is provided of having a cartridge assembly insertable and removable from the casing of the device as a complete assembled unit.

It is an object of this invention to incorporate an improved controlled unbalance pressure relationship between the pressure plates and the ring and the rotor of a fluid energy translating device which is capable of operating at extremely high pressures and temperatures.

Another object of this invention is to provide an improved pumping seal arrangement between the pressure plates and the ring and rotor which form the cartridge.

Still another object of this invention is to provide a rotary fluid device of a symmetrical design having improved delivery, volumetric and overall efficiency characteristics.

A further object of this invention is to provide an unbalanced dual floating pressure plate system which permits adequate control of the leakage paths on both sides of the rotor.

A still further object of this invention is to provide a high performance pump having many advantages without resorting to costly machinery, expensive manufacturing techniques, or unrealistic tolerances.

Another object of this invention is to provide a smaller unit for a given horsepower range than presently used.

Still another object of this invention is to provide a clear, straight-forward, and practical design of pump which has a cartridge unit which is easily assembled in the housing and readily reversible with a minimum amount of time, effort and maintenance.

A further object of the invention is to provide a replaceable cartridge unit having at least one cheek plate adapted to be pressure loaded in fluid sealing engagement with an immediately adjacent vane carrying rotor, A still further object is to provide a removable symmetrical cartridge for a hydraulic pump comprising component parts which are easily replaced with a minimum amount of maintenance.

Further objects and advantages of the present invention will be apparent from the following description, reference being had to the accompanying drawings wherein a preferred form of the present invention is clearly shown.

Figure 2:
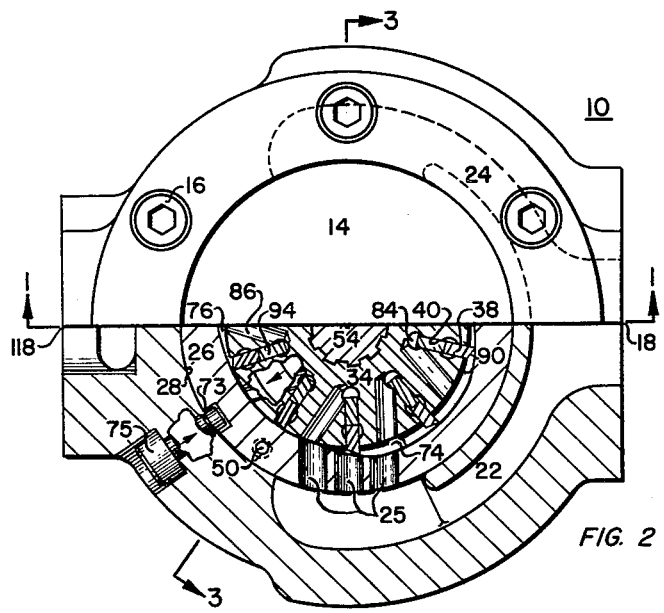
FIGURE 2 is a plan view of the present invention showing a part thereof in section which is taken on line 2—2 of FIGURE 1.
Figure 1:
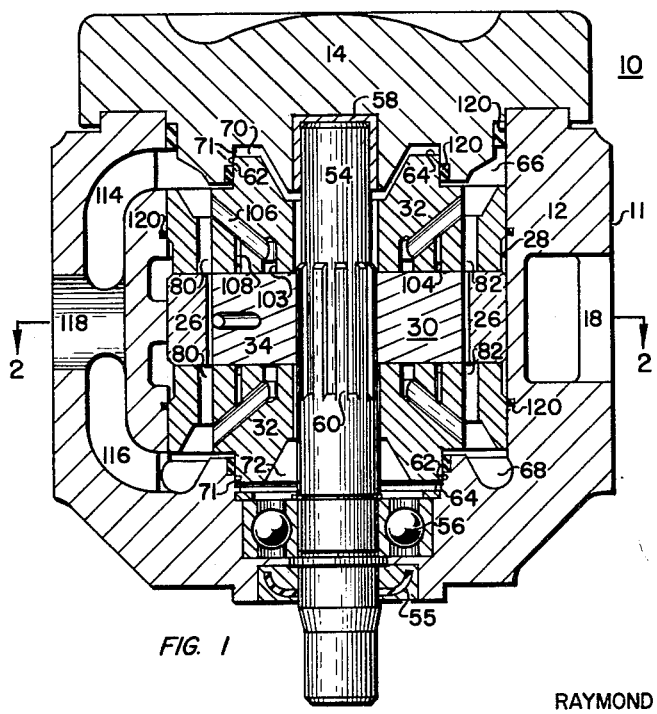
FIGURE 1 is a sectional view of a preferred form of the present invention taken on line 1—1 of FIGURE 2.
Figure 4:
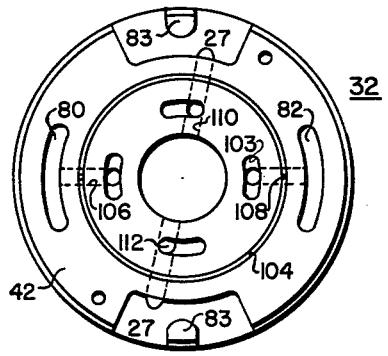
FIGURE 4 is a front view of the inner surface of each cheek plate.
Figure 5:
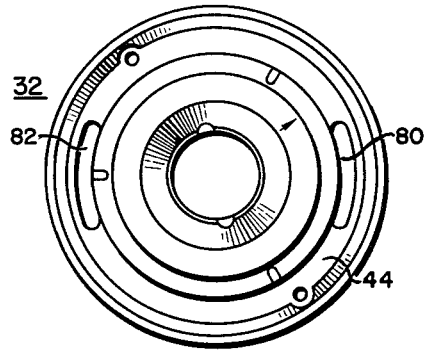
FIGURE 5 is a view of the outer surface of each cheek plate.
Figure 3:
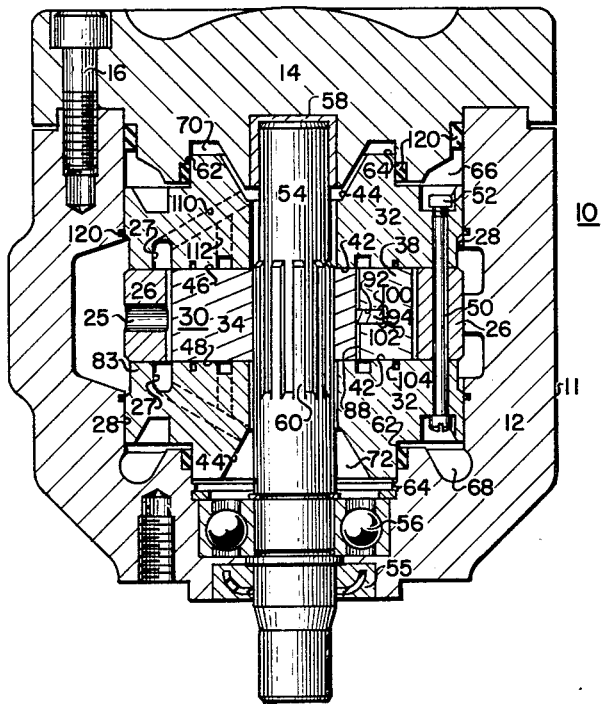
FIGURE 3 is a sectional view taken on line 3—3 of FIGURE 2.

Referring now to FIGURE 1, there is shown a rotary sliding vane device or pump, indicated generally by the numeral 10, the housing 11 of which comprises a body member 12 and an end cover 14 which is secured to the body 12 by bolts 16 extending through cover 14 into the threaded holes provided in the body 12. The body member 12, as shown in FIGURE 2, is provided with an inlet supply connection port 18 having an inlet passage leading therefrom and dividing into two branched passages 22 and 24 respectively, extending in opposite directions, each branch terminating in a plurality of fluid inlet port openings 25 located in the ring 26 and in a pair of inlet ports 27 provided in the pressure plates 32, as will be explained later.

The housing 11 has a cylindrical bore 28 in which is floatably mounted a symmetrically arranged cartridge unit 30 which is comprised of the cam ring 26, a rotor 34, which is rotatable in the cam ring 26, and a pair of identical and interchangeable pressure plates 32, one positioned on each side of the rotor 34 and ring 26. A plurality of vanes 38 are movable in and out of the slots 40 provided in the rotor 34 as the rotor turns around the cam ring 26. Each pressure plate 32 has an identical inner face 42 and an identical outer face 44, the inner face 42 being positioned directly opposite one of the rotor faces 46 and 48 so as to provide a small running clearance between the plates 32 and the rotor 34. A pair of bolts 50 extend through the plates 32 and ring 26. Nuts 52 hold the cartridge unit 30 together. The nut and bolt assemblies hold the ring 26, rotor 34 and plates 32 together as the cartridge unit 30 for assembly convenience as well as to prevent radial rotation of the plates 32 in the bore 28. The nut 52 is usually loosely fitted on the bolt 50 and has no effect on mechanically loading the bolt 50.

The rotor 34 is driven by a shaft 54 supported solely within the body 12 by means of a bearing 56 located near one end of the bore 28 in the body 12 and a bearing 58 located in the cover 14 at the other end of the bore 28. The shaft 54 is free to rotate in each of the bearings which carry the radial and thrust loads to the housing. The shaft 54 is operatively connected to the rotor 34 by means of a spline connection, indicated by the numeral 60. The spline on the shaft 54 fits the spline in the rotor 34 with a very small clearance so that the shaft 54 acts as the locking means for the rotor 34 circumferentially and yet permits a slight amount of play radially and longitudinally for the rotor 34 to take up a position in proper relationship with other elements of the cartridge unit 30. The shaft 54 is provided with a shaft seal 55 which prevents leakage at the juncture of the shaft 54 from the pump body 12.

A stepped-up portion 62 on the outer face 44 of each pressure plate 32 forms an internal annular hub member 64. The hub member 64 has a diameter which is precisely controlled so as to obtain the requisite amount of pressure unbalance on the remaining area of the face 44. This controlled pressure unbalance is very important in the vane pump design in order to obtain a device which is capable of efficient operation through an extensive pressure range. The symmetrical cartridge unit 30 provides a dual floating pressure plate system wherein the amount of unbalance is controlled by the difference in area between the flange diameter and the plate hub diameter. The flange diameter is the outside diameter of the plate 32.

In addition to being able to conveniently alter pressure unbalance, the pressurized areas on the back of the plates 32 are confined to an annular space at the outer rims. The areas are supported substantially by the ring 26, and thereby achieve additional rigidity. This greatly reduces the plate deformation normally experienced in high pressure operation.

The cartridge unit 30 defines with the housing 11 and with the outer ends of the bore 28, a pair of operating pressure chambers 66 and 68, one located at each end of the bore 28, which are connected to the outlet side of the pump 10. The pressure chambers 66 and 68 act against the annular space at the outer rims starting on the outer periphery of the plates 32 and extending inwardly to the hubs 64 so as to urge the pressure plates 32 into fluid sealing engagement with a portion of the outer surfaces of the rotor 34 and into engagement with the cam ring 26.

A pair of low pressure chambers 70 and 72 are also located one on each end of the bore and are connected to the inlet side of the pump 10. The low pressure chambers 70 and 72 are formed by the hub member 64 with the housing surface directly opposite therefrom. Each of the low pressure chambers 70 and 72 have a circumferential surface 71 in the housing 11 in which the stepped-up portion 62 of the floating pressure plate 26 telescopically engages.

A rectangular slot or chamfered hole 73 is provided in the ring 26. A locating pin 75 is adjustably inserted in the housing 11 so as to engage the hole 73, thereby preventing the ring 26 from radially rotating in bore 28. The diameter of the hole 73 is of such a size so as to permit the cartridge unit 30 to move axially in the bore 28 in response to the summation of the hydraulic forces acting on the cartridge 30 and to compensate for any manufacturing stack up of tolerances. The cartridge assembly 30 is considered to be freely floating in the bore 28.

With the rotor 34 mounted within the cam ring 26, two opposing working chambers 74 and 76 are formed through which the vanes 38 pass as the rotor 34 turns. These chambers may be divided into fluid intake zones and delivery zones, the former of which comprise that portion of the chambers 74 and 76 registering with the plurality of inlet passages 25, provided in the ring 26, and with the pair of inlet ports 27 provided in the pressure plates 32. The delivery zones comprise that portion of the chambers registering with the pair of outlet ports 80 and 82 which extend entirely through each of the pressure plates 32.

The pair of inlet ports 27 provided in each of the pressure plates 32 are, in effect, cutout portions in the plate 32 which start at a point on the outer periphery of the flange near the mid section thereof and extend radially, inwardly, and then extend in an axial direction to the inner face 42 of the plate 32. Boss means 83 are located in each of the inlet ports 27 and are flush with the inner surfaces of the pressure plates 32 so as to engage the ring 26. The boss means 83 are provided to prevent excessive deflection of the plates and seizure and binding of the plates with the rotor 34 due to the pressure against the pressurized area on the back of the plates.

It is within the contemplation of this invention that the rotor 34 forming part of the symmetrical dual floating pressure plate cartridge unit 30 may utilize various types of vane constructions. As illustrated, the rotor 34 employs intravanes 38 which are suitable for high pressure operations. It is sufficient to say that the floatable cartridge unit 30 is usable with any type of vane construction including the conventional type of rectangular shaped vane, although a higher pressure is normally obtained with the stepped vane or with the intravane.

The vanes 38 are movable in and out of the slots 40. An enlarged pressure chamber is provided at the inner end of each slot 40 and is indicated by the numeral 84. A plurality of annular passages 86, one for each slot, leads from the periphery of the rotor 34 to the inner enlarged chamber 84 of the vane slots 40. The passages 86 are adapted to alternately transmit low and high pressure to the vane slot pressure chambers 84 and thus to the inner surfaces of the vanes 38, indicated by the numeral 88. The cyclically changing pressure is exerted on the outer edges 90 of the vanes 38 as they traverse the inlet and outlet ramps of the ring or vane track 26.

The intravanes 38 differ from the flat sided device commonly employed of the rectangular type, as previously mentioned, by having a rectangular milled-out section extending from the inner end 88 of the vane to substantially the mid section thereof, which is indicated by the numeral 92. A reaction member, indicated by the numeral 94, is provided for each of the milled-out sections 92 which together with a correlated porting arrangement provides a control and balance of the suction stroke or inlet phase of the device which insures complete extension of the vanes 38 and also maintenance of the outer edges 90 of the vanes 38 in contact with the ring 26 through the complete rotary cycle of the device.

Each of the intravanes 38 also includes an expansible pressure chamber 100 defined by the side walls of the vane slot and the extended cutaway portion of the vane and in which is exposed the pressure responsive outer end surface 102 of the reaction member 94. The pressure from the outlet side of the device is continuously transmitted to the reaction member pressure chambers 100 and acts against the outer exposed surface 102 of each reaction member 94 to urge the reaction member 94 to the position recited.

The inner surface 42 of the plate 32 has a continuous groove 104 which is continuously connected to the pressure side of the device by a pair of passage means 106 and 108, which are connected to the pressure ports 80 and 82, thereby providing continuous pressure to the expansible chambers 100 during the entire operation of the device. During the suction or intake phase, the inlet ports 27 are connected with the low pressure chambers 70 and 72 through passage means 110 provided in each of the plates 32. Axially intersecting the passage means 110 is another passage 112 which supplies inlet fluid to the inner pressure chambers 84 during the inlet quadrant so that the vanes 38 may be balanced at the inner and outer ends.

In the pressure quadrant the pressure ports 80 and 82 are connected with the inner end of the vanes, as well as continuously to the intermediate portion of the vane. As the vanes pass through the inlet zones or the pressure zones the pressure on the inner and outer ends of the vanes is balanced. The high pressure in the intravane expansible chambers 100 is sufficient to maintain the vanes in contact with the vane track 26 during the inlet quadrant.

The outlet ports 80 and 82 are in communication with the pressure chambers 66 and 68. A pair of converging passage means 114 and 116 connect each of the pressure chambers with the outlet connection 118 located in the housing 11. A plurality of O-rings 120 are provided at strategic locations so as to prevent leakage. The outlet connection 118 and the inlet connection 18 are located radially opposite the ring 26.

In operation, hydraulic fluid enters the inlet connection 18 and travels through passage means 22 and 24 to opposite sides of the rotor 34. The symmetrical arrangement of the cartridge unit 30 is such so as to permit the fluid from the passages 22 and 24 to enter the pumping zones 74 and 76 through the passage means 25 provided in the ring 26 and through the inlet ports 27 provided in each of the pressure plates 32 so as to completely fill the pumping zones during the inlet quadrant. While the vanes pass through the inlet quadrant, hydraulic fluid is also transmitted underneath the vanes through the passage means 110 and 112 so as to provide low pressure on the inner and outer ends of the vanes. The expansive chamber 100 is continuously connected to the pressure side so that a resulting force is created in an outward direction and will maintain the vanes 38 in contact with the vane track 26.

As the rotor 34 turns through its arc so as to gradually enter the discharge zone, the pressure at the outer end of the vanes 38 is also transmitted to the inner ends of the vanes through passage means 103. The outlet ports 80 and 82 are connected to the pressure chambers 66 and 68. The pressure in said chambers exerts a somewhat higher effective force in the direction of the rotor seal than in the direction tending to open the seal. Pressurized fluid from the pressure chambers 66 and 68 travels through the passage means 114 and 116 to the outlet connection 118.

In assembling, the bearing supported shaft 54 is inserted into the pump body 11. The cartridge unit 30 is slid over the open end of the shaft 54 into the cavity 28 so that the rotor 34 engages the spline connection 60 of the shaft 54. The cover 14 having a bushing 58 mounted therein is inserted over the open end of the shaft 54 and is attached to the body by bolts 16. When it is desirable or advantageous to change the direction of rotation, the bolts 16 and cover 14 are removed. The cartridge unit 30 is removed, as a unit, reversed end for end, rotated 90° and reinserted on to the shaft 54. Arrows, for example, may be placed on the faces of the plates and aligned with matching arrows located on the body so as to give the desired direction of rotation.

There is thus provided a high pressure vane jump of simple construction which is not only more economical than its predecessors but which is more convenient to assemble, disassemble and maintain. The replaceable pumping cartridge contains all the wearing parts and contributes to the long life with a minimum of attention or service. The construction provides a cartridge type of vane pump having one or a pair of cheek plates of the pressure loaded type engaging the ring and in fluid sealing engagement with the vane carrying rotor. The symmetrical dual pressure plate system employs identical and interchangeable pressure plates. The amount of unbalance is controlled by the area between the outside diameter of the flange and outside diameter of the hub.

Besides the many features enumerated herein, the concentric alignment of the ring, rotor and shaft permits relatively quiet operation of the pump. Another advantage of the duo-plate design results from the balanced inlet and discharge passages which provide additional porting area. This feature also effects a reduction in internal hydraulic losses which may further contribute to quiet operation.

While the form of embodiment of the invention as herein disclosed constitutes a preferred form, it is to be understood that other forms might be adopted, all coming within the scope of the claims which follow.

What is claimed is as follows:

1. A fluid energy translating device comprising: a housing having an external connection outlet port; a cylindrical bore in said housing; a cartridge positioned as a unit in said bore, said cartridge comprising a cam ring, a vane carrying rotor rotatable in said ring and forming a fluid delivery zone, a pair of fluid pressure responsive plates each having inner and outer axial surfaces, said plates arranged, one on each side of said rotor and ring, said plates having their inner surfaces in fluid sealing engagement with the rotor, and holding means maintaining said ring, rotor and pressure plates together as an assembled unit, said means permitting simultaneous pressure responsive loading of said plates with said ring and rotor; a pair of low pressure chambers and a pair of high pressure chambers, one of each located on the outer ends of the bore; means forming a pair of hub areas on the outer surfaces which telescope in said low pressure chambers in response to the fluid outlet pressure in said high pressure chambers acting against the remaining areas on said outer surface; means connecting the fluid delivery zone to each high pressure chamber comprising a fluid outlet port extending completely through each pressure plate which respectively open at opposite ends thereof to the fluid displacement zone and the high pressure chambers immediately adjacent the outer surface of said plates; and means including said pressure plate outlet ports and both of said high pressure chambers for conducting fluid displacement from said fluid delivery zone to the external connection outlet port comprising passage means connecting both of said high pressure chambers to said external connection outlet port.

2. A fluid energy translating device comprising: a casing including an external connection outlet port and having a cavity therein; a removable pumping cartridge inserted into said cavity as a unit, said cartridge comprising a rotor carrying a plurality of substantially radially movable vanes, a cam ring of generally elliptical inner contour surrounding the rotor to form diametrically opposite pairs of fluid intake zones and fluid delivery zones through which the vanes move as the rotor turns, a pair of fluid pressure responsive plates having inner and outer axial surfaces, one of said inner surfaces positioned on each side of the rotor and ring and each of the outer surfaces divided into a hub area and a flange area, said plates including a pair of inlet openings and a pair of outlet openings which communicate with the fluid intake zones and delivery zones respectively, and means maintaining said ring, rotor and pressure plates together as an assembled unit, said means permitting simultaneous pressure responsive loading of said plates with said ring and rotor; a pair of low pressure chambers and a pair of high pressure chambers, one of each said pair of chambers being located at the outer ends of the bore; passage means in said plates connecting said inlet openings with said low pressure chambers; means comprising a pair of outlet ports in each pressure plate connecting the pressure plate outlet openings with said high pressure chambers, whereby fluid outlet pressure in said chambers may telescope the hub areas in said low pressure chambers while acting against the flange areas in holding the plates against the ring; and passage means connecting each high pressure chamber to the external connection port for conducting fluid displacement from said fluid delivery zones through said high pressure chambers to the external connection outlet port.

3. A fluid energy translating device comprising: a housing having an external connection outlet port; a bore in said housing; a replaceable cartridge positioned in said bore as a unit, said cartridge comprising a vane carrying rotor, a cam ring surrounding the rotor and forming a fluid inlet zone and a fluid outlet zone, and a pair of pressure responsive plates arranged on opposite sides of said rotor and ring, each of said plates having an inner axial surface and an outer axial surface; a pair of low pressure chambers and a pair of high pressure chambers, one of each located on the outer ends of the bore; hub portions on the outer surfaces within said low pressure chambers, said plates having a portion of their outer surfaces simultaneously exposed to fluid outlet pressure within said high pressure chambers for causing said plates to be urged toward said rotor in response to the pressure in said high pressure chambers with their inner surfaces in fluid sealing engagement with the ring and rotor; and means for respectively transmitting outlet pressure to the high pressure chambers and for conducting fluid displacement from the fluid outlet zone through both of said high pressure chambers to the external connection outlet port respectively, comprising an outlet port extending through each pressure plate to the pressure chambers adjacent thereto and passage means connecting each high pressure chamber to the outlet connection port.

4. A rotary vane pump comprising: a casing having a cavity therein; an external connection inlet port and an external connection outlet port provided in said casing; a removable pumping cartridge inserted into said cavity as a unit, said cartridge comprising a rotor carrying a plurality of substantially radially movable vanes, a cam ring of generally elliptical inner contour surrounding the rotor to form diametrically opposite pairs of fluid intake zones and fluid delivery zones through which the vanes move as the rotor turns, and a pair of pressure responsive plates, one positioned on each side of the rotor and ring, said plates including a pair of inlet openings and a pair of outlet openings which communicate with the fluid intake and fluid delivery zones respectively; means forming a pair of pressure chambers in communication with the outlet openings of said plates, one at each outer end of the cavity; passage means connecting said external connection inlet port to the inlet openings; and passage means in the casing leading from each pressure chamber to the external connection outlet port for connecting said outlet openings to said outlet port through said pressure chambers, said pressure plates being simultaneously maintained in fluid sealing engagement against the rotor by the fluid outlet pressure in the pressure chambers.

5. A fluid energy translating device comprising: a housing having an external connection outlet port; a cylindrical bore in said housing; an inlet port communicating with said bore; a cartridge slidably positioned in said bore, said cartridge comprising a cam ring, a vane carrying rotor rotatable in said cam ring so as to define fluid inlet zones and fluid outlet zones, and a pair of symmetrical and identical pressure responsive plates, one arranged on each side of said rotor and ring, said plates having inner and outer axial surfaces, said last named surfaces defining with said housing a pair of pressure chambers which are simultaneously exposed to equal areas on said outer surfaces; symmetrically arranged inlet and outlet openings in said pressure plates connected to said inlet and outlet zones respectively, said inlet openings connected to said inlet port and said outlet openings connected to said pressure chambers, whereby the fluid outlet pressure in said chambers axially holds the inner surface of the pressure plates in fluid sealing engagement with said rotor and automatically compensates for the pressure distribution over the inner surfaces that tends to separate said pressure plates from said ring and rotor; and passage means in the housing connecting the pressure chambers to the external connection outlet port for conducting fluid displacement from said fluid outlet zones through both of said pressure chambers to said outlet connection port.

6. A fluid energy translating device comprising: a housing having a chamber; a shaft rotatably mounted in said housing; and a replaceable cartridge insertable into and removable from said chamber as a unit, said cartridge comprising a cam ring, a slotted rotor rotatable in the ring, driven by said shaft and carrying a plurality of substantially radially movable vanes to form fluid intake zones and fluid delivery zones through which the vanes move as the rotor turns, and a pair of cheek plates, one on each side of the rotor and ring, each of which is responsive under fluid pressure into fluid sealing engagement with the ring and rotor, said plates having inlet and outlet openings, the former of which extends partially through each of said plates starting on the outer periphery and leading to the inner surface at a point engaging said rotor and ring, and boss means in each of said inlet openings adjacent said ring for preventing deflection and seizure of said plates when subjected to the pressure from the outlet openings connected to the delivery zone.

7. A fluid energy translating device comprising: a housing having a chamber; a shaft rotatably mounted in said housing; and a replaceable cartridge insertable into and removable from said chamber as a unit, said cartridge comprising a cam ring, a slotted rotor rotatable in the ring, driven by said shaft and carrying a plurality of substantially radially movable vanes to form fluid intake zones and fluid delivery zones through which the vanes move as the rotor turns, and a pair of cheek plates, one on each side of the rotor and ring, both cheek plates being simultaneously exposed to and responsive under fluid pressure into fluid sealing engagement with the ring and rotor, said plates having inlet and outlet openings, the former of which extends partially through each of said plates starting on the outer periphery and leading to the inner surface at a point engaging said rotor and ring, and boss means in each of said inlet openings adjacent said ring for preventing deflection and seizure of said plates when subjected to the pressure from the outlet openings connected to the delivery zone, said boss means permitting inlet fluid to flow around said means to said inlet zone.

8. In a vane type rotary pump the combination of: a casing including an external connection outlet port and comprising a body and a cover; a cavity located in said casing; a shaft having a driven end rotatably mounted in said body and the free end rotatably mounted in the cover; a removable pumping cartridge inserted as a unit into the body's portion of the cavity from the free end of the shaft and forming together with the body and cover two pressure chambers, one at each end of and immediately adjacent the cartridge, said cartridge including a cam ring, a vane carrying rotor within said cam ring forming a fluid delivery zone and driven by said shaft, and a pair of cheek plates located on opposite sides of the rotor and ring, each cheek plate having a fluid outlet port extending therethrough connecting the fluid delivery zone to the pressure chambers immediately adjacent thereto whereby said cheek plates are simultaneously responsive to fluid outlet pressure in the pressure chamber immediately adjacent thereto for fluid sealing engagement with the ring and rotor, said cartridge being slightly shiftable axially within said cavity and pressure chambers, and said cartridge providing a pumping unit which is easily removable as a unit from the casing by initially removing the cover and then axially extracting the cartridge from the free end of the shaft; and passage means in the casing connecting each pressure chamber to the external connection outlet port for conducting fluid displacement from said fluid delivery zone through both of said pressure chambers to said outlet connection port.

9. In a vane type rotary pump the combination of: a casing including an external connection outlet port and comprising a body and a cover; a cavity located in said casing; a shaft having a driven end rotatably mounted in said body and the free end rotatably mounted in the cover; and a removable pumping cartridge inserted as a unit into the body's portion of the cavity from the free end of the shaft and forming together with the body a pressure chamber immediately adjacent one side of the cartridge at the driven end of the shaft and together with the body and cover forming another pressure chamber at the other side of the cartridge at the free end of the shaft, said cartridge including a cam ring, a vane carrying rotor within said cam ring forming a fluid delivery zone and driven by said shaft, and a pair of cheek plates located on opposite sides of the rotor and ring, each cheek plate having a fluid outlet port extending therethrough connecting the fluid delivery zone to the pressure chambers immediately adjacent thereto whereby said cheek plates are simultaneously responsive to fluid outlet pressure in the pressure chamber immediately adjacent thereto for fluid sealing engagement with the ring and rotor, said cartridge providing a pumping unit which is easily removable as a unit from the casing by initially removing the cover and then axially extracting the cartridge from the free end of the shaft; and passage means connecting each pressure chamber to the external connection outlet port for conducting fluid displacement from said fluid delivery zone through both of said pressure chambers to said outlet connection port.

References Cited by the Examiner
UNITED STATES PATENTS

| | | | |
|---|---|---|---|
| 904,781 | 11/08 | Hoard et al. | 91—138 |
| 1,010,956 | 12/11 | Read et al. | |
| 1,038,477 | 9/12 | Baker et al. | 103—136 |
| 1,123,977 | 1/15 | Baker et al. | 103—136 |
| 1,136,756 | 4/15 | Baker et al. | 103—136 |
| 1,635,522 | 7/27 | Wilson | 230—152 |
| 1,737,942 | 12/29 | Pagel | 103—135 |
| 1,989,900 | 2/35 | Vickers | 103—136 |
| 2,335,284 | 11/43 | Kendrick | 103—136 |
| 2,377,556 | 6/45 | Jeannin | 103—136 |
| 2,384,872 | 9/45 | Baker et al. | 91—80 |
| 2,544,987 | 3/51 | Gardiner et al. | 103—135 |
| 2,632,398 | 3/53 | Ferris. | |
| 2,710,581 | 6/55 | Rosaen | 103—136 |
| 2,782,724 | 2/57 | Humphreys | 103—136 |
| 2,787,959 | 4/57 | Jeannin et al. | 103—136 |
| 2,808,814 | 10/57 | Stewart | 91—138 |
| 2,809,588 | 10/57 | Stewart | 103—216 X |
| 2,853,023 | 9/58 | English | 103—136 |
| 2,880,678 | 4/59 | Hoffer | 103—126 |
| 2,924,182 | 2/60 | Blasutta et al. | 103—136 |

FOREIGN PATENTS

| | | |
|---|---|---|
| 274,041 | 10/27 | Great Britain. |
| 80,737 | 3/56 | Netherlands. |

OTHER REFERENCES

Dudco Division of the New York Air Brake Co. Catalog, Sheets PFF–100, Pumps, April 1955, 2 pages.

Vickers, Inc., Bulletin M–5108, April 1955, 1 page.

Vickers, Inc., Parts Catalog No. I–1695–S, Jan. 27, 1958, 4 pp.

Dudco Div. of New York Air Brake Co. Bulletin No. 10–410.1, May 1961, 4 pages.

Vickers, Inc., Bulletin M–5113, February 1962, 4 pages.

JOSEPH H. BRANSON, JR., *Primary Examiner.*

LAURENCE V. EFNER, *Examiner.*